United States Patent [19]
Sakai

[11] 4,081,102
[45] Mar. 28, 1978

[54] CAP FOR FUEL TANK

[75] Inventor: Yoshiharu Sakai, Atsugi, Japan

[73] Assignee: Nihon Radiator Co., Ltd., Tokyo, Japan

[21] Appl. No.: 778,850

[22] Filed: Mar. 18, 1977

[30] Foreign Application Priority Data

Mar. 25, 1976 Japan .............................. 51-35187[U]

[51] Int. Cl.² ............................................ B65D 51/16
[52] U.S. Cl. ..................................... 220/203; 220/295; 220/303; 220/DIG. 33
[58] Field of Search ........ 220/203, 209, 208, 293–298, 220/301–304, DIG. 32, DIG. 33

[56] References Cited

U.S. PATENT DOCUMENTS

| 3,724,707 | 4/1973 | Burgess | 220/203 |
| 3,784,047 | 1/1974 | Cooper | 220/DIG. 32 |

Primary Examiner—George T. Hall
Attorney, Agent, or Firm—Gordon W. Hueschen

[57] ABSTRACT

A fuel tank cap comprising an inner plate having a skirt around its periphery, said skirt having a pair of locking projections provided on its lower portion, said skirt also having a recess extending between said locking projections and formed in said lower portion, an outer plate fixed in overlapping relation to a surface of said inner plate, and an annular gasket mounted on the periphery of said inner plate.

7 Claims, 7 Drawing Figures

CAP FOR FUEL TANK

The present invention relates to a fuel tank cap and, more particularly, to a cap for covering the fuel supply inlet of a fuel tank in an automobile, the cap being constructed so that it cannot be retained or jammed in half-engaged or insufficiently sealing relation to the fuel supply inlet.

As shown in FIGS. 1 and 2, a conventional fuel tank cap comprises an outer plate 6 having a grip 2 on its top and a flange 4 around its periphery, and an inner plate 14 having a skirt 8 around its periphery and a pain of locking projections 10 and 10 extending horizontally and disposed on lower portions of the skirt 8, the projections being diametrically opposed to or angularly spaced 180° apart from each other. The inner plate 14 has a central raised portion 12 projecting upwardly and attached concentrically to the underside of the outer plate 6. Between the outer plate 6 and a step portion 16 provided between the skirt 8 and the raised portion 12, there are interposed an annular plate spring 18 around the raised portion 12 and an annular gasket 20 underlying the place spring 18.

The cap is installed on a fuel supply inlet 22 as follows: The cap is placed on the inlet 22 with the locking projections 10 and 10 received in a pair of recesses 26 and 26 formed in a pipe end 24 of the inlet 22 and angularly spaced 180° apart from each other. The cap is pressed down with the annular gasket 20 in contact with the pipe end 24, and at the same time the cap which is coaxial with the inlet 22 is revolved in the direction of the arrow in FIG. 1. The locking projections 10 and 10 become engaged with cam walls 28 and 28 turned downwardly from the pipe end 24, and are pushed down as the projections 10 and 10 slide along over the cam walls 28 and 28. At this time, the annular gasket 20 is pressed against the pipe end 24 under the resiliency of the annular plate spring 18 to thereby cover the fuel supply inlet 22 completely.

When the cap is manipulated in a hurry for attachment to the inlet 22, it is likely that only one of the locking projections 10 and 10 is inserted in one of the recesses 26 and 26 with the other projection 10 on the pipe end 24, as illustrated in FIG. 3, and the cap is rotated in a half-engaged state. The difficulty results from the excessive height of the halves of the skirt 8 that extend between the locking projections 10 and 10, as is apparent from the FIGS. 1 through 3. More specifically, when in a half-engaged position, the cap has its central axis showed and the skirt 8 is inclined and has a portion fitted in contact with the inner peripheral surface of the cam wall 28, the central axis of the cap being substantially located at the center of the fuel supply inlet 22. As the cap is revolved in the direction of the arrow illustrated in FIG. 1, only one of the locking projections 10 and 10 is displaced along the cam wall 28, while the other locking projection 10 moves over an inner marginal edge 30 of the pipe end 24. At this time, a portion of the annular gasket 20 which is above the locking projection 10 that engaged the cam wall 28 becomes gradually pressed and raised by an outer marginal edge 32 of the pipe end 32. When the cap is revolved further, the engaging projection 10 becomes lowered as the central axis of the cap is rendered more askew. The more askew the axis of the cap, the greater the abutting portion of the skirt 8 is pressed against the inner surface of the cam wall 28. Thus, as seen from FIG. 3, the cam wall 28 and the outer marginal edge 32 are sandwiched with great force between the locking projection 10 engaging the cam wall 28 and the annular gasket 20 supported by the annular plate spring 18 which in turn is supported by the outer plate 6. The opposite projection 10 is held forcibly against the other cam wall 28. As a result, the cap is retained or jammed due to frictional resistance against removal from the inlet 22.

With the cap covering the fuel supply inlet incompletely, evaporated fuel in the tank leaks out therethrough and, during driving of the automobile, fuel in the tank tends to flow out therethrough or the cap itself is proved to become disengaged when subjected to vibration. Thus, the conventional cap cannot meet the safety requirements for the fuel tanks.

Accordingly, it is an object of the present invention to provide an improved fuel tank cap.

Another object of the present invention is to provide a cap for covering the fuel supply inlet of a fuel tank in an automobile, the cap being so constructed as not to be installed in half-engaged or insufficiently sealing relation to the fuel supply inlet.

These objects can be attained by providing a fuel tank cap comprising an inner plate having a skirt around its periphery, said skirt having a pair of locking projections provided on its lower portion, said skirt also having a recess extending between said locking projections and formed in said lower portion, an outer plate fixed in overlapping relation to an upper surface of said inner plate, and an annular gasket mounted on the periphery of said inner plate.

The fuel tank cap constructed in accordance with the invention thus provide a relatively large recess in the lower portion of the skirt of the inner plate and between the locking projections on the skirt, the recess acting as a relief against jamming which would otherwise occur when the cap is mounted on the pipe end of a fuel supply inlet in a half-engaged manner.

The present invention will be best understood from the following detailed description when taken in conjunction with the accompanying drawings, in which.

Figure 1:
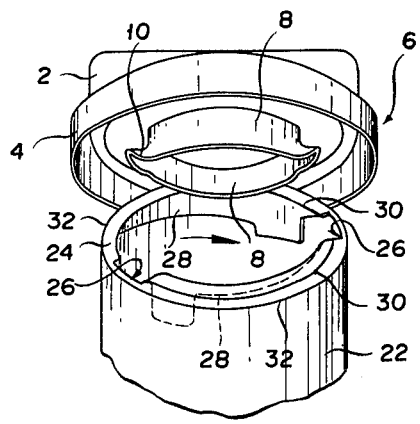
FIG. 1 is a perspective view of a conventional fuel tank cap.
Figure 2:
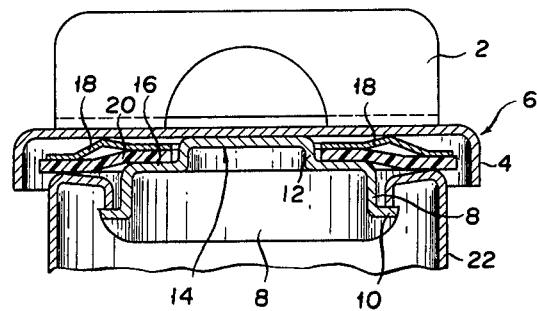
FIG. 2 is an enlarged cross-sectional view of the cap shown in FIG. 1, the cap fully covering the pipe end of a fuel supply inlet.
Figure 3:
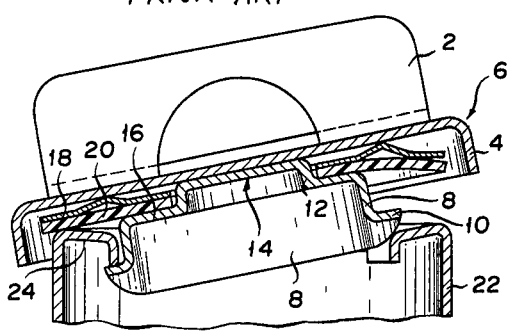
FIG. 3 is an enlarged cross-sectional view of the cap shown in FIG. 1, the cap being mounted in half-engaged or insufficiently covering relation to the pipe end.
Figure 4:
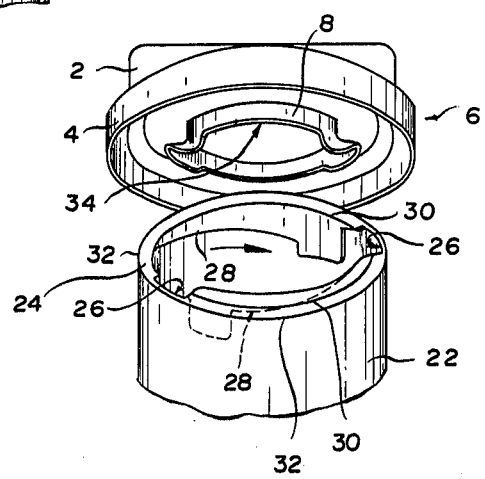
FIG. 4 is a perspective view of a fuel tank cap constructed in accordance with the present invention.
Figure 5:
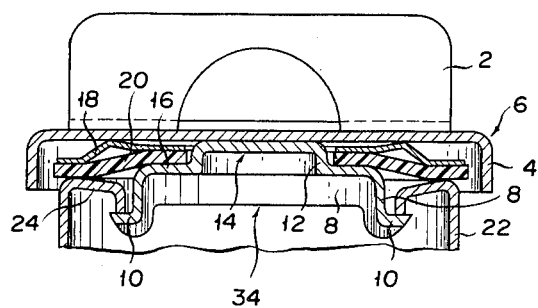
FIG. 5 is an enlarged cross-sectional view of the cap illustrated in FIG. 4, the cap being fully engaged with the pipe end.

In FIGS. 4 and 5, a fuel tank cap in accordance with the present invention comprises an inner plate 14 having around its periphery a skirt 8 which is provided on its lower portion with a pair of horizontally extending locking projections 10 and 10 spaced angularly 180° apart from each other or held in diametrically opposed relation to each other. The inner plate 14 has a central raised portion 12 projecting upwardly. The cap further comprises an outer plate 6 having a flange 4 around its periphery, with the undersurface of the outer plate 6 being overlappingly attached to the top surface of the raised portion 12. The halves of the skirt 8 that extend between the locking projections 10 and 10 have a pair of relatively large recesses 34 and 34 formed therein, the recesses being substantially coextensive in length with the skirt halves. Between the outer plate 6 and a stepped portion 16 defined by the skirt 8 and the raised portion 12, there are sandwiched an annular plate spring 18 and an annular gasket 20 underlying the spring 18, the spring 18 and the gasket 20 surrounding the raised portion 12.

The cap is installed on a fuel supply inlet 22 as follows: The cap is placed on the inlet 22 with the locking projections 10 and 10 received in a pair of recesses 26 and 26 formed in a pipe end 24 of the inlet 22 and angularly spaced 180° apart from each other. The cap is pressed down with the annular gasket 20 in contact with the pipe end 24, and at the same time the cap which is coaxial with the inlet 22 is revolved in the direction of the arrow in FIG. 4. The locking projections 10 and 10 become engaged with the cam walls 28 and 28 turned downwardly from the pipe end 24, and are pushed down as the projections 10 and 10 slide along over the cam walls 28 and 28. At this time, the annular gasket 20 is pressed against the pipe end 24 under the resiliency of the annular plate spring 18 to thereby cover the fuel supply inlet 22 completely.

Figure 6:
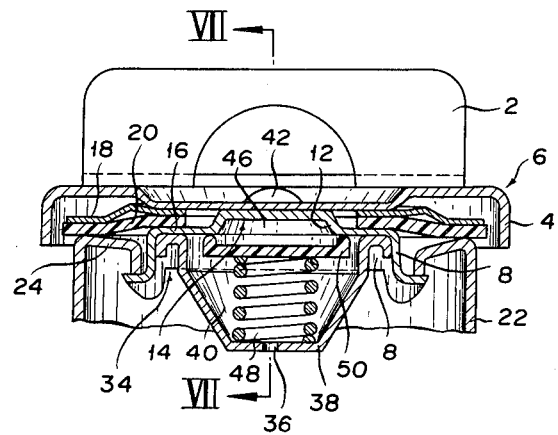
FIG. 6 is an enlarged cross-sectional view of a modified fuel tank cap, which fully covers the pipe end.
Figure 7:
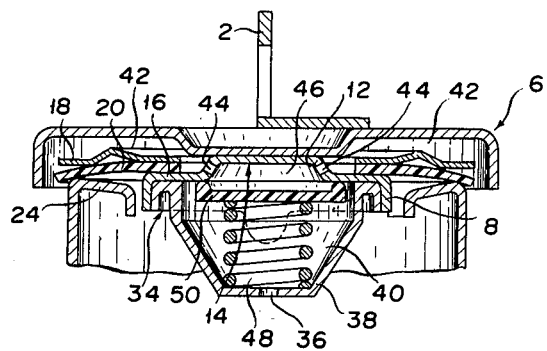
FIG. 7 is a cross-sectional view taken along line VII—VII of FIG. 6.

A modified cap provided in accordance with the present invention is shown in FIGS. 6 and 7, the cap comprising an inner plate 14 having around its periphery a skirt 8 which is provided on its lower portion with a pair of locking projections 10 and 10 extending horizontally and spaced angularly 180° apart from each other or diametrically opposed to each other. The inner plate 14 has a central raised portion 12. The cap also includes an outer plate 6 having a flange 4 around its periphery, the outer plate 6 being attached to the upper surface of the inner plate 14. The skirt 8 has a pair of relatively large recesses 34 and 34 formed therein and extending between the locking projections 10 and 10. A stepped portion 16 is formed between the skirt 8 and the raised portion 12. Sandwiched between the stepped portion 16 and the outer plate 6 are an annular plate spring 18 disposed around the raised portion 12 and an annular gasket 20 underlying the plate spring 18. A cup-shaped housing 38 is fixed to the underside of the inner plate 14 to provide a space or hollow chamber 40, the housing 38 having a through hole 36 formed in the bottom thereof. As best shown in FIG. 7, the outer plate 6 is formed with one or more expanded air passageways 42 above the plate spring 18. A plurality of apertures 44 are formed through the raised portion 12 to provide communication between the passageways 42 and a space 46 beneath the raised portion 12 of the inner plate 14, as that air can flow from the exterior through the passageways 42 into the space 46. A compression coil spring 48 is disposed in the housing 38 and supported on its bottom, the spring 48 carrying thereon a valve body 50 made of an elastomeric material such as rubber, for example. The spring 48 normally biases the valve body 50 against the underside of the stepped portion 16 so as to close the space 46.

The cap thus constructed can be affixed in completely sealing relation to the fuel supply inlet 22 in the same way as with the cap illustrated in FIGS. 4 and 5. With the cap attached, as fuel in the tank is consumed and its level lowered, a negative pressure is developped in the tank, thereby allowing air in the space 46 to lower the valve body 50. Upon downward movement of the valve body 50, air is admitted into the chamber 40, through the hole 36, and into the tank until an air pressure within the tank becomes equalized with the atmospheric pressure.

With the cap of the invention, the skirt 8 of the inner plate 14 has the large recesses 34 and 34 between the locking projections 10 and 10, which recesses act as a relief such that the skirt 8 is kept out of engagement with the cam walls 28 and 28 which would otherwise be in the way and cause jamming when only one of the locking projections 10 and 10 engages with the cam wall 28 and the cap is turned to cause the central axis of the cap, and hence the skirt 8, to be inclined. Accordingly, the cap, even when in half-engaged position, is prevented from being fixed or jammed under a condition in which the inclined, recess-free shirt 8 is held forcibly against the cam wall 28. The cap can at all times be released without jamming unless both of the locking projections 10 and 10 are received in the recesses 26 and 26 of the fuel supply inlet 22.

What is claimed is:

1. In a fuel tank cap comprising an inner plate having a locking peripheral skirt having bayonet-type projections projecting radially from its lower portion and adapted to engage complementary bayonet slots in a fuel inlet pipe, a cover plate fixed in overlapping relation to a surface of said inner plate, and an annular gasket mounted on the periphery of said inner plate, the improvement characterized in that the lower portion of said peripheral skirt is cut away between said projections to provide elongated recesses extending substantially from projection to projection, whereby said locking projections project both axially and radially from said skirt.

2. A fuel tank cap according to claim 1, in which said locking projections are spaced angularly 180° apart from each other.

3. A fuel tank cap according to claim 2, in which said inner plate has a central raised portion, the upper surface to which said cover plate is fixed, and a flat annular portion extending from said central raised portion to said peripheral skirt.

4. A fuel tank cap according to claim 3, further including an annular plate spring and an annular gasket underlying said plate spring, said spring and gasket surrounding said raised portion of said inner plate and having the inner portions thereof disposed between said flat annular portion and said cover plate.

5. A fuel tank cap according to claim 3, further including a cup-shaped housing attached to said flat annular portion to provide a hollow chamber beneath said raised portion, said housing having a through hole in its bottom, said raised portion having apertures formed therethrough for effecting communication between said hollow chamber and the ambient atmosphere, and a valve body disposed within said housing and located beneath said inner plate, said valve body being a flat disc having upstanding annular sealing edges adapted to contact said annular portion and seal off said hollow chamber from communication with the ambient atmosphere.

6. A fuel tank cap according to claim 5, further including a compression coil spring disposed in said housing and supported on the bottom of said housing, said spring carrying thereon said valve body and being adapted to press said annular sealing edges into sealing contact with said annular portion.

7. A fuel tank cap according to claim 5, in which said outer plate has at least one expanded air passageway above said plate spring.

* * * * *